May 31, 1960    M. WILKERSON    2,938,496
BIRD CAGE WITH CONVEYOR TYPE DISPOSABLE FLOOR
Filed Sept. 9, 1955
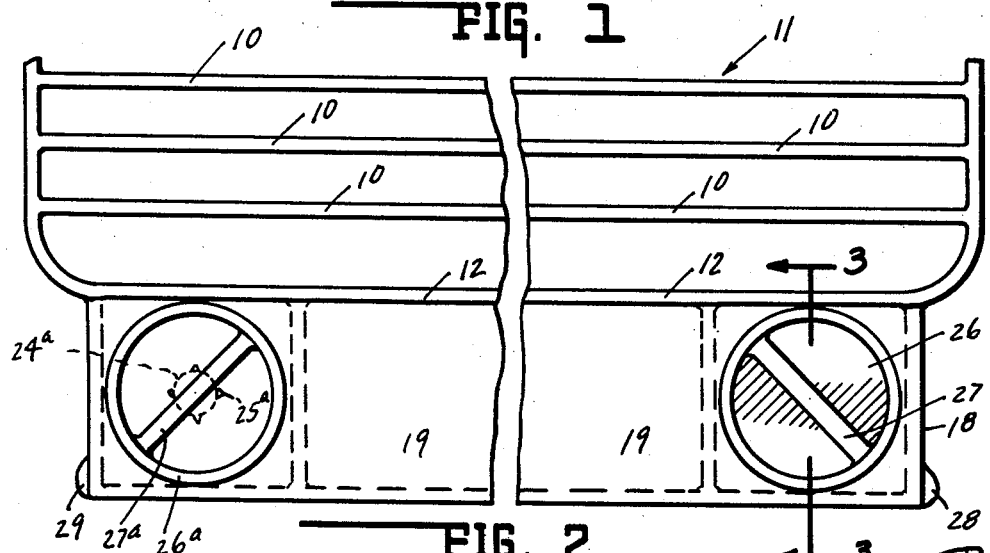
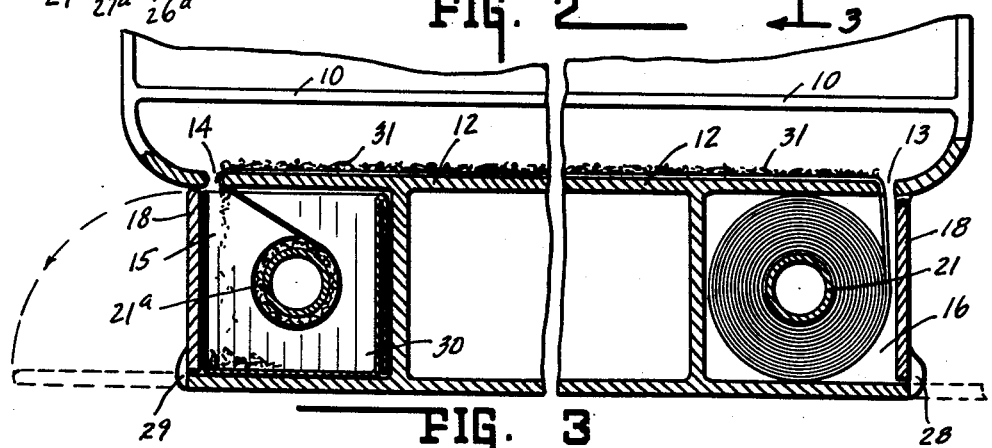
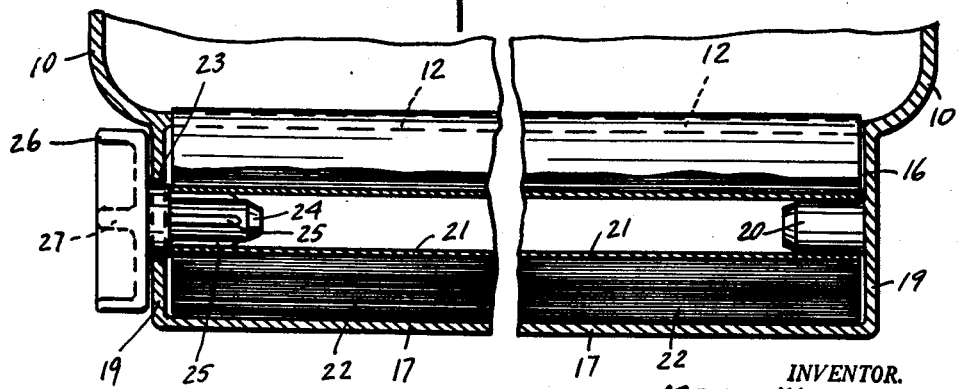
INVENTOR.
MAX WILKERSON.
BY
Lockwood, Galt, Woodard & Smith
ATTORNEYS.

United States Patent Office 2,938,496
Patented May 31, 1960

2,938,496

BIRD CAGE WITH CONVEYOR TYPE DISPOSABLE FLOOR

Max Wilkerson, 1847 Elmhurst Drive, Indianapolis, Ind.

Filed Sept. 9, 1955, Ser. No. 533,307

2 Claims. (Cl. 119—17)

This invention relates to a bird cage construction, and more particularly to the character and construction of the conveyor assembly mounted in the bottom thereof for readily disposing of the bird droppings, gravel and the like.

Heretofore, as is well known to every person owning a bird and a bird cage, one of the biggest problems has been how to keep the cage and the surrounding area clean and neat. Many methods and devices have been employed in an effort to remove bird droppings and gravel from the cage in the easiest way possible, and to prevent their falling to the floor of the room. One of the methods most commonly employed is to put an ordinary newspaper or the like in the bottom of the cage with a portion thereof extending upwardly and flaring outwardly therefrom to serve as a barrier to prevent the droppings or gravel from falling to the floor. This particular method is not only a nuisance in itself but as well is unsightly. Other methods have been based upon the use of sheets of paper which rest on the floor of the cage and can be removed individually when desired thereby exposing a relatively clean sheet. However, this method and others having similar objects in view have been attended by many disadvantages.

It is, therefore, the primary object of the present invention to provide a bottom construction for a bird cage which will enable the droppings, gravel and the like to be removed from the bottom of the cage without the necessity of the person each time touching the paper itself.

It is a further object of the present invention to provide an assembly for removing the droppings, gravel or the like from the floor of the cage, the assembly working parts being substantially hidden from view and not in any manner detracting from the appearance or eye appeal of the cage.

It is a still further object of the present invention to provide a conveyor assembly for readily and easily removing droppings and the like from the floor of the cage to a container mounted in a compartment below one end of the cage. The container being readily removable from the compartment, and of disposable or throw-away character. In this manner not only the droppings and the like are removed but the dirtied paper as well.

It is a still further object of the present invention to provide a bottom construction for a bird cage which has a minimum number of parts, is inexpensive to manufacture and is easily assembled.

The full nature of the invention will be understood from the accompanying drawings and the following description and claims:

In the drawings,

Fig. 1 is a broken side elevation view of the bottom construction of the bird cage with parts of the cage removed.

Fig. 2 is a broken vertical section view through the bottom construction of the cage.

Fig. 3 is a transverse section view taken on line 3—3 of Fig. 1 in the direction of the arrows.

In the drawings the wires 10 form the usual cage portion shown generally at 11, parts of the cage being broken away since the invention does not reside per se in its character or style. Thus the cage portion may be of any configuration and style or design that is desired. It is provided with a bottom 12 extending from end to end and from side to side thereof in the conventional manner. However, a pair of transverse slots 13 and 14 are formed through the floor, each slot communicating with a front compartment or chamber 15 and a rear compartment or chamber 16 respectively. Each chamber extends substantially from side to side of the cage as shown particularly in Fig. 3, and each is defined by the floor 12, the vertical partition 16, the cage bottom 17, the end wall 18 and the side wall 19.

The chamber 16 may be provided with an inwardly directed stub shaft 20 for receiving, locating and centering the tubular core, spool or roller 21 about which is trained the paper 22 or other suitable material.

The opposite end of chamber 16, and more particularly that which is formed by the side wall 19 of the cage bottom is provided with an opening 23 through which is extended the stub shaft 24 having ribs or the like 25, the shaft being connected to the dial 26 having finger grip portion 27 for rotating purposes. The rear end wall 18 defining the cage bottom portion may be hinged at 28 to the bottom to enable the end wall to be moved outwardly and downwardly whereby a roll of paper may be inserted within the chamber.

The opposite and front end wall 18 is also hinged at 29 to enable it to be moved outwardly and downwardly to the position shown in dotted lines. In the front chamber there is positioned a disposable box or container 30 through the ends of which openings are formed for reception of stub shaft 24a that projects inwardly from the knurled dial 26a having the diametrically extending finger grip means 27a. Just as in the case of the roller or spool assembly mounted in the rear chamber, a stub shaft 24a is provided with ribs 25a to enable the shaft to frictionally grip the inner walls of the tubular core for driving purposes.

The opposite end of the front chamber may also be provided with a stub shaft similar to 20 for the purpose of centering and locating the adjacent end of the tubular core 21a. Of course, other means may be employed than those shown and described to mount the driven spool 21 and the driving spool 21a within their respective chambers.

In operation the user will place a new spool of paper within chamber 16 by first moving the hinged door or end 18 downwardly and then angularly placing the spool within the chamber until one end thereof is located and centered about the stub shaft 20 whereupon the other end of the spool may be moved into place fully within the chamber. It will be understood, of course, that the dial 26 to which the stub shaft 24 is connected will have first been removed from the bottom of the cage, and more particularly from within the chamber. Once, however, a new spool of paper is properly centered and located within that chamber the dial and more particularly its shaft 24 will be extended through the opening 23 so that it will be disposed within the tubular core with the ribs of the shaft frictionally embracing the inner surfaces of the core. The paper will then be threaded upwardly through transverse slot 13 whereupon it will be extended along the floor of the cage so as to cover it and thence downwardly through slot 14.

As will be observed particularly from Fig. 2, the paper will be reversely rolled about the tubular core 21a so that the droppings, gravel and the like 31 will automatically be spilled and will fall by gravity into the hopper or disposable box 30. The reverse roll end of the paper may be connected to that core in any suitable way such for example as providing a slot in the core itself or by simply wrapping two or three layers of the paper about the core until it will automatically turn as the core is turned.

By turning the knurled dial 26a in a clockwise direction the paper will be wrapped progressively about the spool or tubular core. Thus 26a is the driving dial and presents and exposes a clean length of paper along the bottom of the cage. Once the supply of paper is exhausted the hinged door or front end 18 may be swung outwardly and downwardly whereupon after the dial is removed from engagement with the core and from the end walls of the box, the box with the paper, droppings and gravel therein may be thrown away. A new roll of paper will then be taken from a new box and placed as heretofore described, in the rear chamber. The box itself, however, with its top 30a will be placed in the front chamber whereupon the paper will be properly wound about the spools or cores as heretofore described.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a bird cage construction having a cage including a bottom portion with a floor, a pair of fore and aft compartments formed in said bottom portion adjacent opposite ends of said floor, said floor having a transverse slot formed therein in communication with each compartment; the combination of a driven spool of paper rotatably mounted in one compartment, a driving spool rotatably mounted in the other compartment, said paper extending from said driven spool through one of said slots across the floor and through the other slot into operable engagement with said driving spool, and a disposable box for used paper and bird droppings removably mounted in the compartment containing said driving spool.

2. In a bird cage construction having a cage including a bottom portion with a floor, a pair of compartments formed in said bottom portion adjacent opposite ends of said floor, said cage having a slot formed therein in communication with each compartment; the combination of a driven spool of paper rotatably mounted in one compartment, a driving spool rotatably mounted in the other compartment, said paper extending from said driven spool through one of said slots across the floor and through the other slot into operable engagement with said driving spool, and a receptacle for used paper and bird droppings removably mounted in the compartment containing said driving spool.

References Cited in the file of this patent

UNITED STATES PATENTS

| | | |
|---|---|---|
| 300,249 | Gregory | June 10, 1884 |
| 304,174 | Colman | Aug. 26, 1884 |

FOREIGN PATENTS

| | | |
|---|---|---|
| 139,111 | Switzerland | June 16, 1930 |
| 158,162 | Switzerland | Jan. 16, 1933 |